United States Patent

Cronk et al.

[11] Patent Number: 5,939,136
[45] Date of Patent: *Aug. 17, 1999

[54] PROCESS FOR PREPARATION OF OPTICAL FIBER DEVICES USING OPTICAL FIBERS WITH THERMALLY REMOVABLE COATINGS

[75] Inventors: Bryon J. Cronk; James C. Novack, both of Hudson, Wis.; Bruce A. Rabine, Oakdale, Minn.; Paul E. Sanders, Madison, Conn.

[73] Assignee: Minnesota Mining and Manufacturing Company, St. Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/631,491

[22] Filed: Apr. 12, 1996

[51] Int. Cl.[6] .............................. B05D 5/06; G02B 6/245
[52] U.S. Cl. .................. 427/163.2; 427/261; 427/266; 427/385.5; 427/275; 427/178; 427/348; 264/1.24; 264/1.6; 264/2.3
[58] Field of Search ................... 427/163.2, 261, 427/266, 385.5, 275, 226, 228, 178, 348; 264/1.24, 1.6, 2.3

[56] References Cited

U.S. PATENT DOCUMENTS

| | | | |
|---|---|---|---|
| 3,635,454 | 1/1972 | Angelo et al. | 263/3 |
| 4,277,272 | 7/1981 | Schneider | 427/163.2 |
| 4,957,343 | 9/1990 | Sato et al. | 350/96.21 |
| 5,051,577 | 9/1991 | Lutz et al. | 250/227.17 |
| 5,277,730 | 1/1994 | Darsey et al. | 156/158 |
| 5,367,596 | 11/1994 | Chou | 385/116 |
| 5,596,669 | 1/1997 | Murphy et al. | 385/128 |

FOREIGN PATENT DOCUMENTS

| | | | |
|---|---|---|---|
| 4140 087 A1 | 9/1993 | Germany | G02B 6/245 |
| 1024861 | 6/1983 | Russian Federation | G02B 5/16 |

OTHER PUBLICATIONS

Haibara et al., "New Fiber Coat Stripping Method for High–Strength Splicing," *Applied Optics*, vol. 22, No. 19, pp. 2945–2947 (Oct. 1, 1983).

Alavie et al., "A Multiplexed Bragg Grating Fiber Laser Sensor System," *IEEE Photonics Tech. Lett.*, vol. 5, No. 9, pp. 1113–1114 (Sep. 1993).

Brochure, "Fiber Optic Strain Measurement Systems," ElectroPhotonics Corporation. no date.

Bittence, J., "Specifying Materials Statistically—A simplified explanation of a complex method," *Machine Design*, vol. 50, No. 2, pp. 79–83 (Jan. 26, 1978).

Epstein, B., "Statistical Aspects of Fracture Problems," *Journal of Appl. Physics*, vol. 19, pp. 140–147 (Feb., 1948).

Farries et al., "Fabrication and Performance of Packaged Fibre Gratings for Telecommunications," Optical Fibre Gratings and Their Applications—Colloquium organized by Professional Group E13 (Optical Devices and Systems) (Jan. 30, 1995).

Kalish et al., "Fiber Characterization—Mechanical," *Optical Fiber Telecommunications*, Ch. 12, pp. 405–417 (Academic Press, London, 1979). (no mo.).

(List continued on next page.)

*Primary Examiner*—Janyce Bell
*Attorney, Agent, or Firm*—Néstor F. Ho; H. Sanders Gwin, Jr.

[57] ABSTRACT

A method of making an optical fiber device, which comprises the steps of providing an optical fiber element comprising an optical fiber having at least one thermally removable coating thereon, and thermally removing all or a predetermined portion of the thermally removable coating(s) to sufficiently expose said optical fiber for a subsequent processing step. Following removal of the thermally removable coating, the optical fiber has a predetermined median fracture stress, as measured according to FOTP-28. The optical fiber may then be processed into an optical fiber device and optionally recoated.

22 Claims, 6 Drawing Sheets

OTHER PUBLICATIONS

Measures et al., "Bragg Grating Fiber Optic Sensing for Bridges and Other Structures," 2nd European Conference on Smart Structures and Materials, Invited Paper, pp. 12–14 (Oct. 1994).

Melle et al., "Practical fiber–optic Bragg grating strain gauge system," *Applied Optics*, vol. 32, No. 19, pp. 3601–3609 (reprint Jul. 1, 1993).

Tariyal et al., "Ensuring the Mechanical Reliability of Lightguide Fiber," *The Western Electrical Engineer*, pp. 63–67 (Winter 1980).

ANSI/EIA–455–28A "Method for Measuring Tensile Failure Point of Optical Waveguide Fibers," (Electronic Industries Association, Washington, D.C., May 1986).

ANSI/EIA/TIA–455–28B "Method for Measuring Dynamic Tensile Strength of Optical Fiber," (Electronic Industries Association, Washington, D.C., Oct. 1991).

Product sheet, 3M Fiber Bragg Gratings (1995). (no mo.).

Brochure, 3M Silica Optical Fibers Application Note (Jun. 1995).

PROCESS FOR PREPARATION OF OPTICAL FIBER DEVICES USING OPTICAL FIBERS WITH THERMALLY REMOVABLE COATINGS

BACKGROUND OF THE INVENTION

1. Field of the Invention

The present invention relates to a process for the preparation of optical devices, such as sensors, gratings, splitters, couplers, and the like. More particularly, the present invention relates to a continuous or stepwise continuous process for making optical sensors which uses as a starting material optical fiber elements comprising an optical fiber coated with at least one thermally removable coating. In the process of the invention, all or a portion of the coating is thermally removed to sufficiently expose the bare optical fiber to allow subsequent processing into an optical fiber device. The thermal removal of the coating is performed under conditions such that the optical fiber substantially retains its physical integrity.

2. Description of Related Art

Glass optical fibers are particularly susceptible to chemical and/or mechanical attack, which greatly decreases the physical integrity of the optical fibers and leads to their premature failure. Therefore, in the construction of glass-based optical fiber elements, a coating is usually applied to a glass optical fiber immediately after drawing to protect the bare glass surface of the fiber from the detrimental effects of chemical and/or mechanical attack which would otherwise occur.

If the coated optical fiber element is to be used in the manufacture of an optical fiber device, it may be necessary to thermally, chemically or mechanically remove all or a part of the protective coating from the coated optical fiber to leave a bare fiber surface. The bare fiber or bare fiber section which remains may then be further processed to form an optical fiber sensor. See, for example, Rizvi and Gower, *Production of Bragg Gratings in Optical Fibers by Holographic and Mask Production Methods*, The Institute of Electrical Engineers, Optical Fiber Gratings and Their Applications, January 1995. However, conventional thermal, mechanical or chemical means for stripping the coating from the bare fiber in sensor manufacturing processes reduce the physical integrity of the fiber. For example, mechanical stripping with a knife or tool may cause scratches on the glass fiber surface, which ultimately lead to fine cracks and decreased fiber strength. Solvents or concentrated acids may be applied to the optical fiber element to swell the coating and facilitate its removal, but such chemical stripping techniques often leave a residue on the fiber surface which reduces fiber strength and interferes with subsequent processing steps. Heat may be applied to deteriorate or burn away the coating, but the charred residue which results reduces fiber strength and may require additional coating removal steps prior to processing. In addition, the glass fiber absorbs heat during coating pyrolysis, which may result in fiber embrittlement. See, e.g., M. C. Farries et al., *Fabrication and Performance of Packaged Fiber Gratings for Telecommunications*, The Institute of Electrical Engineers, Optical Fiber Gratings and Their Applications, January 1995; Tang et al., *Annealing of Linear Birefringence in Single-Mode Fiber Coils: Application to Optical Fiber Current Sensors*, Journal of Lightwave Technology, vol. 9, No 8, August 1991.

U.S. Pat. No. 4,957,343 to Sato et al. describes a method for splicing "plastic clad" optical fibers using fusion bonding with a high temperature electrical discharge. The splicing method in Sato is conducted using optical fibers with a glass core, a polymeric clad layer coated adjacent the core, and a protective sheath coated adjacent the clad layer. The Sato reference teaches that the clad layer adjacent the glass core be made of a resin which, when pyrolyzed in the high temperature electric arc during fusion bonding, leaves only a small residuum at the fiber endfaces. Sato et al. state that any coating may be used which has a residuum, following thermogravimetric analysis, less than a predetermined amount, preferably 10% or less by weight, more preferably 3% or less by weight. Materials suggested for the clad layer include fluorine-containing methacrylates and polyfluorovinylidene.

Sato et al. claim that, compared to splices formed at the endfaces of uncoated (air-clad) fibers, the residuum which remains at the endface following fusion splicing does not significantly increase splice losses in the fused fiber. Thus, reliable splices may be formed without the need for removal of the clad layer prior to splicing, and the integrity of the optical path is preserved. With respect to physical integrity, the high temperature fusion bonding procedure described in the '343 patent is claimed not to "deteriorate" the glass fiber (col. 2, lines 38–41). However, as noted above, it is known in the art that rapid heating of the glass fiber causes fiber embrittlement, and the working examples of the '343 patent state that reinforcement is required to increase strength following the splicing procedure (col. 5, lines 40–45). In addition, manufacture of many types of optical devices requires removal of a significant length, or the entirety, of the coating from an optical fiber. The high-temperature pyrolysis described in Sato et al. has not been demonstrated effective for removal of large lengths of coating without deterioration of the fiber's physical properties, and would not be expected to be practical for continuous or stepwise continuous coating removal operations on a commercial scale.

Thus, whether protective optical fiber coatings are partially or totally removed in sensor manufacturing processes, an unknown amount of surface damage will occur from the exposure and physical handling of the optical fiber during mechanical, chemical or thermal stripping operations. Accordingly, a need exists in the art for a commercially practicable continuous or stepwise continuous coating removal procedure which minimizes degradation of the fiber's physical properties and substantially preserves the pristine fiber surface to permit effective subsequent processing. The desired process would reduce or eliminate fiber handling steps and, where applicable, minimize the exposure time of the bare fiber before recoating.

SUMMARY OF THE INVENTION

The present invention provides a process for preparing an optical fiber for the making of an optical fiber device. In the process of the invention, an optical fiber element is initially provided which includes an optical fiber, preferably made of a silica-based glass, which is coated with one or more thermally removable coatings. The optical fiber has a known initial strength, which may be evaluated by a measurement of its median fracture stress according to ANSI/EIA/TIA 455-28B-1991 (FOTP-28). All or a portion of the coatings are thermally removed to sufficiently expose the optical fiber to allow subsequent processing into an optical fiber device. The thermal removal is performed such that the optical fiber retains a predetermined percentage of its initial median fracture stress as required for its intended end use application, as measured by FOTP-28.

In addition, it is highly desirable that the thermal removal be performed such that the homogeneity of the fiber strength is retained. The strength distribution of the fiber following thermal removal of the coating should be narrow, as evidenced by a sufficiently high Weibull modulus or slope, m, for an intended application as measured by FOTP-28.

Following the subsequent processing step, the optical fiber device may be recoated with the thermally removable coating, recoated with a conventional coating, or incorporated into a subsequent processing step.

During the coating removal step, the thermally removable coating(s) used in the process of the invention must rapidly thermally degrade such that the optical fiber absorbs a minimum of thermal energy. In addition, the thermally removable coating(s) must be sufficiently removed such that substantially no residue remains on the surface of the optical fiber to interfere with subsequent processing or degrade the physical strength of the optical fiber. Preferably, the removable coating is a polymeric material which, with the application of heat, rapidly de-polymerizes to lower molecular weight species which volatilize in the processing environment leaving little to no residue such that the optical fiber retains a predetermined amount of its initial average fracture stress.

The thermal removal step may be performed in any suitable manner, but it is important in the process of the invention that the temperature of the optical fiber remain sufficiently low to preserve its physical integrity. Thus, it is preferred that thermal removal of the coating(s) be performed with a heated gaseous stream to facilitate rapid coating removal and minimize overheating of the optical fiber.

The present invention also extends to optical fiber devices made by the above-described process.

The process of the invention provides a continuous or stepwise continuous method for preferentially or completely removing the protective coating(s) from a glass optical fiber with minimum physical damage to the glass. The fiber may then be further processed into any one of a wide variety of optical fiber devices The process of the invention eliminates the potential fiber damage caused from the blades of a mechanical stripping tool or chemicals used to swell the coating to assist in the removal processes. The process of the invention leaves substantially no residue on the fiber surface, so the deterioration in physical strength caused by wiping the surface of the fiber to remove coating debris does not occur. In addition, the process of the present invention eliminates the need to soak the fiber in flammable, corrosive and potentially toxic solvents as routinely performed in the art, which simplifies the optical fiber device manufacturing process. The process of the present invention therefore dramatically reduces the exposure time of bare optical fiber and eliminates associated handling practices utilized in present manufacturing processes.

DETAILED DESCRIPTION OF THE INVENTION

Figure 1:
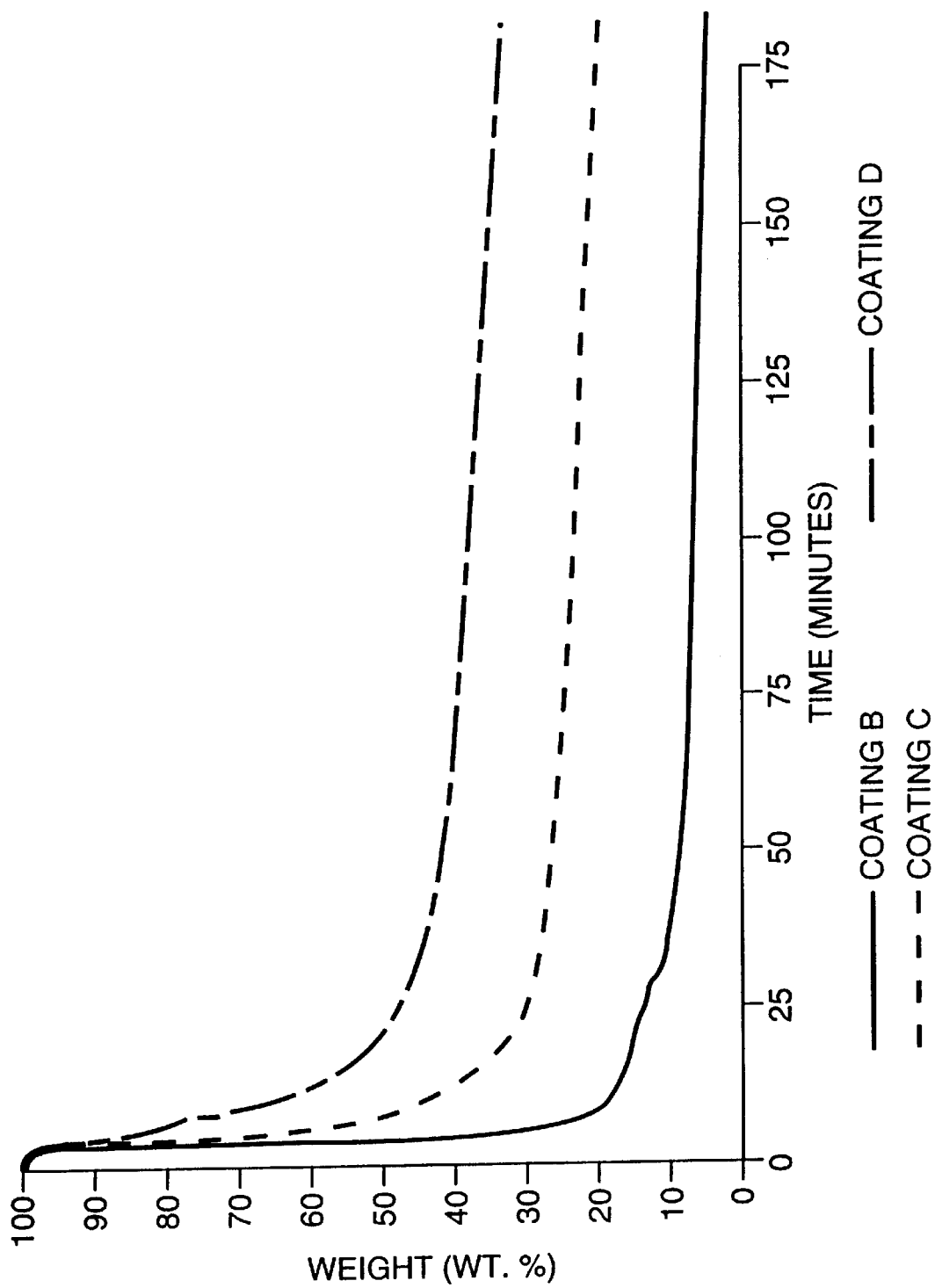
FIG. 1 is an isothermal thermogravimetric analysis (TGA) plot at 400° C. of the coatings used in Example 1.

As is well known in the art, fiber optic cables generally consist of optical fiber(s), and one or more buffer layers around the fiber to protect the optical fiber from microbending losses and abrasion (see, for example, Sterling, *Technician's Guide to Fiber Optics,* (1993), at page 73). In the present application, the term "bare fiber" or "optical fiber" refers to the portion of the fiber optic cable from which the buffer and external strength members have been removed. If a non-strippable protective layer lies beneath the buffer, the protective layer is considered part of the bare fiber. In this application, the term "removable coating" refers to any coating layer applied to the optical fiber, bare fiber, or bare fiber with a non-strippable protective layer, but does not include the strength members or the jacket which make up the outer layers of the cable.

The optical fiber which is used in the process of the present invention may be made of any material, such as plastic or glass. Conventional silica-based glass materials are preferred.

The removable coating(s) used in the process of the present invention may be any polymeric material which may be easily coated on the optical fiber with conventional equipment. The removable coating(s) must be subsequently thermally removed to leave substantially no residue on the surface of the optical fiber. In addition, thermal removal must occur in a commercially feasible time such that the fiber does not absorb sufficient heat to reduce its tensile strength below a predetermined level.

First, in selecting a polymeric coating material for use in the process of the invention, it is important that the material be substantially completely removable in a commercially feasible time from the optical fiber. Carbonaceous residue which remains in contact with the bare fiber surface following incomplete thermal removal of a coating creates a local stress concentration, which degrades the tensile strength of the fiber. In addition, the small flakes which remain on the surface of the optical fiber following incomplete coating removal may interfere with subsequent processing steps.

For the purposes of the present application, the term substantially complete removal refers to any polymeric coating which, following thermal removal, has a residuum of less than about 10% by weight, preferably less than about 5% by weight, based on the initial coating weight, after thermal treatment in air at about 300° C. to about 900° C., preferably about 400° C. to about 700° C., most preferably about 500° C. to about 600° C. Coatings which may be used in the process of the invention may be identified with a wide variety of analytical techniques, such as thermogravimetric analysis (TGA).

Of course, to be useful in the process of the present invention, which is preferably continuous or stepwise continuous, the substantially complete removal of the coating should be completed in a commercially feasible time, which for the purposes of the present application, is less than about 15 seconds, preferably less than about 10 seconds, and most preferably less than about 1 second. The thickness of the removable coating or coatings used in the process of the present invention may vary widely depending on the intended application, but a conventional coating thickness of about 15 μ to about 35 μ is normally used.

Second, the substantially complete thermal removal referred to above must be accomplished such that the fiber does not absorb sufficient heat to reduce its tensile strength below a predetermined level required for a particular end use application. For the purposes of the present invention, the tensile strength of the optical fiber is measured by evaluation of the median fracture stress according to ANSI/EIA/TIA-455-28B-1991, which will be referred to herein as FOTP-28. In this test procedure, the optical fiber under test is threaded between a gripping mechanism and a capstan. The fiber is then elongated at a fixed strain rate until it breaks. The rate of elongation is expressed as %/min., relative to the gauge length, and tensile load at failure is measured by an appropriate load cell. The fracture stress, $\sigma_f$, is the primary parameter used to support strength performance, and is calculated as follows:

$$\sigma_f = T/A_g$$

where T is the force (tension) experienced by the specimen at failure, and $A_g$ is the cross-sectional area of the fiber. See, for example, Tariyal et al., *Ensuring the Mechanical Reliability of Lightguide Fiber*, Western Electric Engineer, Winter 1980.

For the purposes of the present application, the strength of an optical fiber is expressed as a median fracture stress for a particular population, and this median fracture stress value must remain above a predetermined level following thermal coating removal. Typically, the thermal removal of the coating must reduce the initial median fracture stress, not more than about 50%, preferably not more than about 25%, and most preferably not more than about 15%.

However, optical fiber strength testing is statistical in nature, and many individual fibers, each of which is representative of a given population, must be tested for strength. The result is reported for the population as a whole as a strength distribution, and this distribution is characterized by slope, m, (also referred to as the Weibull modulus) of the well-known Weibull plot. See, for example, Bittence, *Specifying Materials Statistically*, Machine Design, vol. 50, No. 2 (1978); Epstein, *Statistical Aspects of Fracture Problems*, Journal of Applied Physics, vol. 19, February 1948A, Bacon, *Silica Optical Fibers Application Note*, 3M, June 1995. In the present process, the Weibull modulus is a measure of the homogeneity of fiber strength retained following thermal coating removal. The strength distribution of the fiber following thermal coating removal should be narrow, as evidenced by a sufficiently high Weibull modulus or slope, m, for an intended application as measured by FOTP-28.

A large m in excess of about 100 corresponds to a uniform or narrow strength distribution, and suggests that a characteristic fracture stress exists for the fiber and that the probability of failure does not become significant until the applied tensile stress approaches that characteristic value. On the other hand, a low Weibull modulus of less than about 20 suggests that the probability of failure is significant at almost any applied stress, and is indicative of low mechanical reliability. Typically, the thermal removal of the coating must reduce the initial (e.g., prior to thermal coating removal) Weibull modulus not more than about 50%, preferably not more than about 25%, and most preferably not more than about 15%.

Figure 4:
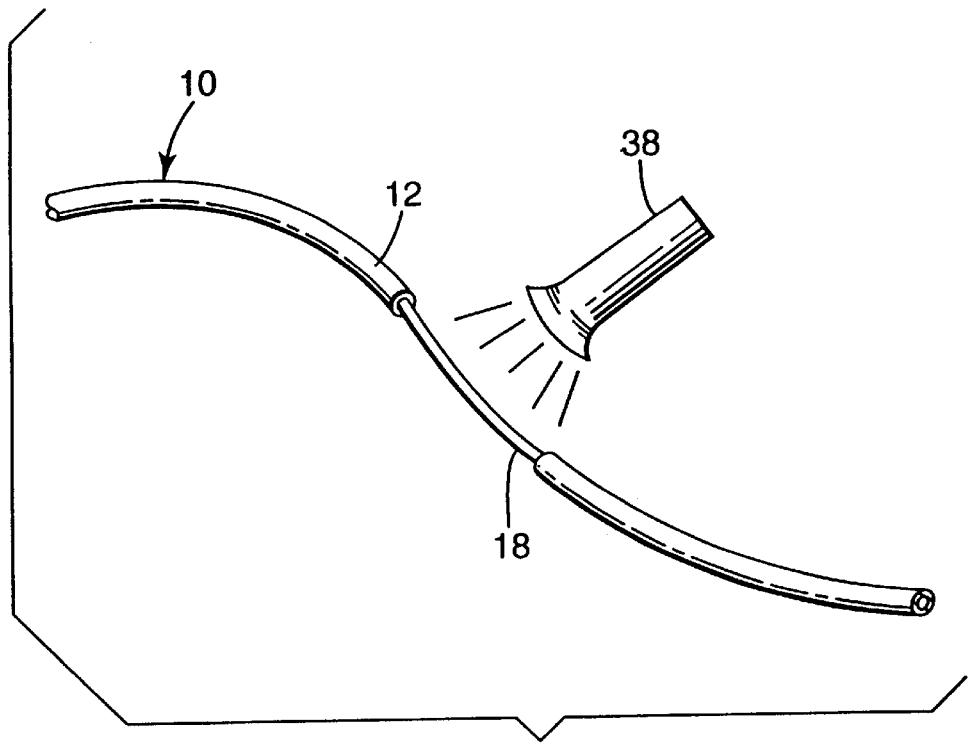
FIG. 4 is a schematic diagram of an apparatus which may be used to thermally remove the thermally removable coatings in the process of the present invention.

The optical fiber fracture stress following coating removal is sensitive to the amount of heat applied to the fiber. Therefore, it is important in the process of the invention that heat be applied during the coating removal step such that a minimum of thermal energy is transferred to the optical fiber. The heat may be applied to thermally remove the coating in any appropriate manner which preserves the physical integrity of the optical fiber, such as with a heated resistance filament or other radiant type heat source, a $CO_2$ laser or a heated gaseous stream. FIG. 4 is a schematic representation of the coating removal step of the process of the present invention, in which sections of coating may be preferentially removed from the optical fiber in a controlled fashion. In FIG. 4, an optical fiber element 10, which is coated with a thermally removable coating 12, is heated by a localized heat source, such as a source of heated gas 38, thus revealing a portion of a residue free glass surface 18.

Thermal removal of the coating is preferably performed using a heated gaseous stream. While not wishing to be bound by any theory, the heated gaseous stream is believed to assist in volatilization of the polymeric coating material and sweep away the depolymerized product with minimum transfer of heat to the optical fiber. The gaseous stream may comprise any gas or mixture of gases, including air, nitrogen, argon, and the like, and nitrogen is preferred for its inert properties and availability. Gas mixtures containing oxygen are less desirable for use in the process of the present invention, since the heat of combustion generated during thermo-oxidative processes increases the temperature of the glass and degrades its strength characteristics.

The gaseous stream may be applied by any suitable technique, such as with an air gun or an air knife. However, an air knife is preferred for a commercially feasible continuous or stepwise continuous process for preferential removal of a predetermined length of coating. The tensile strength of the fiber may be optimized by using a heat source, fixed at a desired distance, at the appropriate temperature to remove the thermally removable coating. Of course, the parameters will vary widely depending on the coating selected, coating thickness, the processing time, gas flow rate, and gas temperature. For example, a resistance wire coiled in a circular tube with a restricted output placed about 2 to about 10 mm from the surface of the coating, preferably about 5 mm, with a gas flow rate of about 1 to about 3 scfm, and a gas stream temperature from about 400° C. to about 900° C., preferably about 600° C. to about 700° C., has been found effective for suitable thermal removal of the coating described in this invention.

Figure 6:
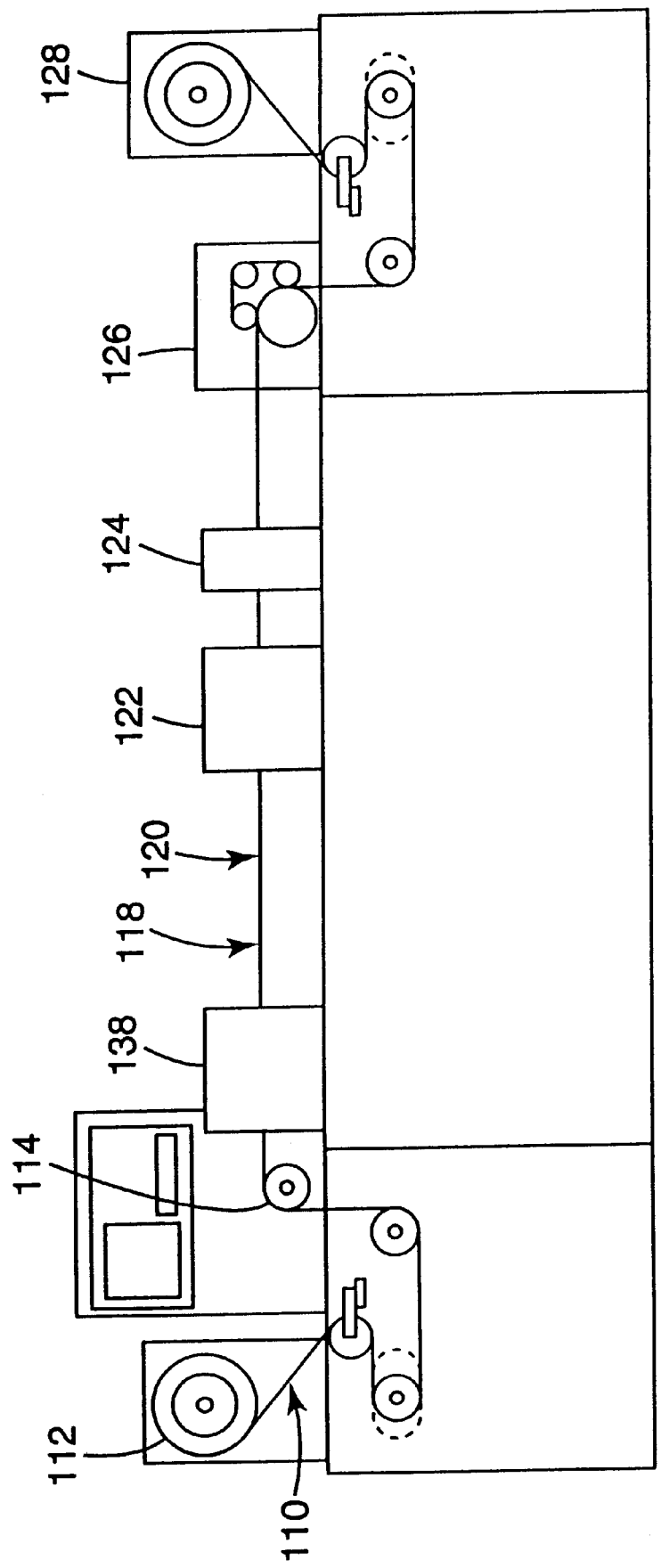
FIG. 6 is a schematic diagram of a system for continuous or stepwise continuous processing of optical fiber elements according to the present invention.

A schematic diagram of a continuous or stepwise continuous process for optical sensor manufacture according to the present invention is illustrated in FIG. 6. In FIG. 6. the coated optical fiber element 110 is unwound from a tension controlled payoff spool 112 through a precision positioning device 114. The fiber element 110 then enters a fiber heater 138, which may comprise, for example, an air knife, for thermal removal of a predetermined length of the removable coating. The bare fiber 118 which is exposed by coating removal then proceeds into a processing zone 120, where the fiber is treated to form an optical sensor using processes known in the art. Following this processing step, the optical fiber sensor (not shown) may be further processed or may enter an optional in-line coater 122 to protectively re-coat the portion of bare fiber now containing the sensor. The recoated optical fiber sensor would then enter an optional coating curing zone 124. The sensor with cured coating is then drawn onto an isolation capstan 126 and finally wound onto a tension controlled takeup spool 128. The recoating process is recommended prior to subjecting the bare fiber to any mechanical detriment, such as an isolation capstan of fiber guide, as this severely degrades the strength characteristics of the fiber.

Any number of treatment steps may be performed on the exposed section of bare optical fiber 118 in the processing zone 120 of FIG. 6 to produce a broad array of optical fiber devices for various applications. For example, the exposed section of the bare optical fiber 118 may be treated with a laser to form an optical fiber Bragg grating. The Bragg grating may be produced in the optical fiber by any method known in the art, such as, for example, phase mask projection or holography. See, for example, Farries et al., *Fabrication and Performance of Packaged Fiber Gratings for Telecommunications,* and Rizvi et al., *Production of Bragg Gratings in Optical Fibers by Holographic and Mask Projection Methods,* Institution of Electrical Engineers, Optical Fiber Gratings and Their Applications, January 1995. The resulting optical fiber Bragg grating reflects an extremely narrow spectral band of an incoming signal, and may be used in applications such as fixed and tunable filters, fiber and diode lasers, wavelength division multiplexing, fiber amplifiers and sensors. See, for example, Measures et al., *Grating Fiber Optic Sensing for Bridges and Other Structures,* 2d European Conference on Smart Structures and Materials, October 1994; Melle et al., *Practical Fiber-Optic Bragg Grating Strain Gauge System,* Applied Optics, vol. 32, no. 19, July 1993; and Alavie et al., *A Multiplexed Bragg Grating Fiber Laser Sensor System,* IEEE Photonics Technology Letters, vol. 5, No. 9, September 1993.

Other types of optical fiber devices which may be produced in the exposed bare portion 118 of the optical fiber include, for example, current sensors. Presently, as described in co-pending U.S. application 08/205,880 to Cronk et al., and U.S. Pat. No. 5,051,577 to Lutz et al., the disclosures of which are hereby incorporated by reference, useful optical fiber sensor coils (birefringence <3°, with immeasurable change from −40 to +80° C.) are produced by removing the coating from an appropriate length of optical fiber by mechanical stripping The stripped optical fiber is cleaned with alcohol to provide a clean surface for cleaving and fusion splicing processes. The fiber is then placed in an annealing fixture which is placed into an annealing oven. The annealing process is performed and the mold is removed from the oven.

In sensor manufacture, mechanical stripping and subsequent handling of the bare sensor fiber exposed the fiber to potential mechanical damage. Such damage and subsequent strength reduction of this critical portion of the optical sensor could cause the fiber to break and the sensor to fail in the field. In some processes the fiber coating is softened by soaking in solvent to render the coating more easily stripped by mechanical means. The fiber can then be further processed. The process of the invention eliminates the hazard of placing optical fibers which may still contain traces of flammable solvents directly into an annealing furnace. Likewise the use of the process of the present invention eliminates the hazard associated with solvent pre-soaking the coating and the strength degradation associated with mechanical stripping in these processes.

Figure 7:
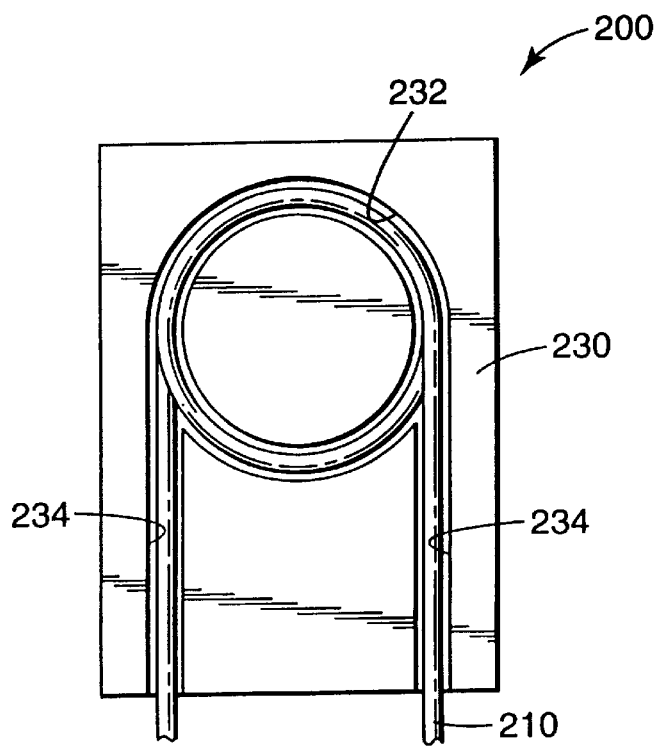
FIG. 7 is a schematic diagram of an apparatus which may be used to prepare an optical fiber current sensor according to the process of the present invention.

FIG. 7 illustrates an embodiment of a fiber coil holder 200 for making an optical fiber current sensor using the thermal coating removal process of the present invention. A circular groove 232 is formed integrally with a plate 230 by sandblasting into the surface. Channels 234 may also be sandblasted into the surface to provide guides for the terminal ends of the fiber coil. Holder 230 is used as a mold or form for annealing by loosely winding the coated optical fiber element 210 in the circular groove 232 and then placing the holder 230 in a heated environment to substantially thermally remove the coating.

In addition to the specific applications mentioned above, following thermal removal of a predetermined portion of the removable coating, the processing step of the process of the invention may be used to prepare optical fiber splitters and couplers. Further, if the optical fiber element is embedded in a composite material, such as graphite/epoxy composite, a thermally removable coating may be used to protect the optical fiber during composite preparation, and the coating may be subsequently removed via depolymerization and diffusion during the thermal processing step which cures the composite. A thermally removable coating may also be used as a carrier of a liquid component, which is released upon removal of the coating during the processing step allowing the liquid to wet the fiber or cure the surrounding composite material. Additionally, the thermally removable coating permits separation of the interdependency of the draw process with further process steps which are not compatible with standard draw techniques, such as hermetic coating applications.

Following the processing steps, the optical fiber devices produced may optionally be recoated with a protective coating. The protective coating may be the same as the thermally removable coating, or may be selected from any coating material known in the art. Following the recoating step, if the thermally removable coating is used, the protective coating may be treated to make it less thermally susceptible to removal if necessary to provide improved thermal or chemical resistance to the completed optical fiber device.

Following the recoating step, the completed optical fiber sensor may be wound on a takeup reel or further processed as necessary for its intended application.

The invention will be further described with reference to the following non-limiting examples.

EXAMPLES

Example 1

Coatings which may be used in the process of the invention may be identified with a wide variety of analytical techniques, such as thermogravimetric analysis (TGA). FIG. 1 is an isothermal plot at 400° C. in air of 10.5 mg samples of three cured acrylate films, available from DSM Desotech, Inc., Elgin, Ill., which are known to be useful as optical fiber coatings. About 66% by weight, based on the initial amount of coating material under test, of Example coating D, an acrylated epoxy available from DSM Desotech under the product identification DSM 3471-2-137, volatilizes after three hours at 400° C., compared to about 79% by weight of Example coating C, an acrylated urethane available from DSM Desotech under the product identification DSM 3471-2-113. However, about 95% by weight of Example coating B, a multi-functional acrylate available from DSM Desotech under the product identification DSM 5000-2, volatilizes at 400° C. over the same time period.

Figure 2:
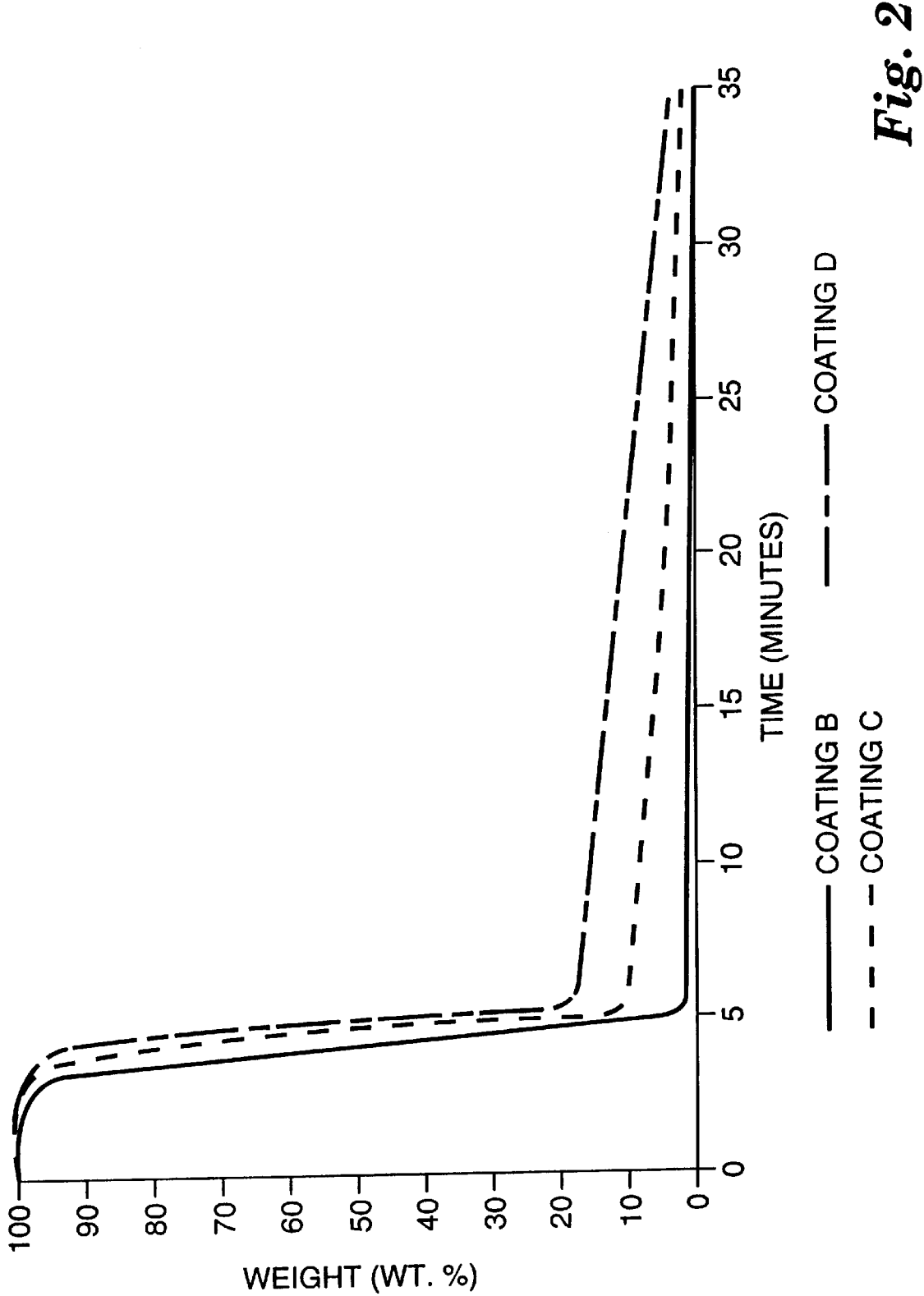
FIG. 2 is an isothermal TGA plot at 500° C. of the coatings used in Example 1.
Figure 3:
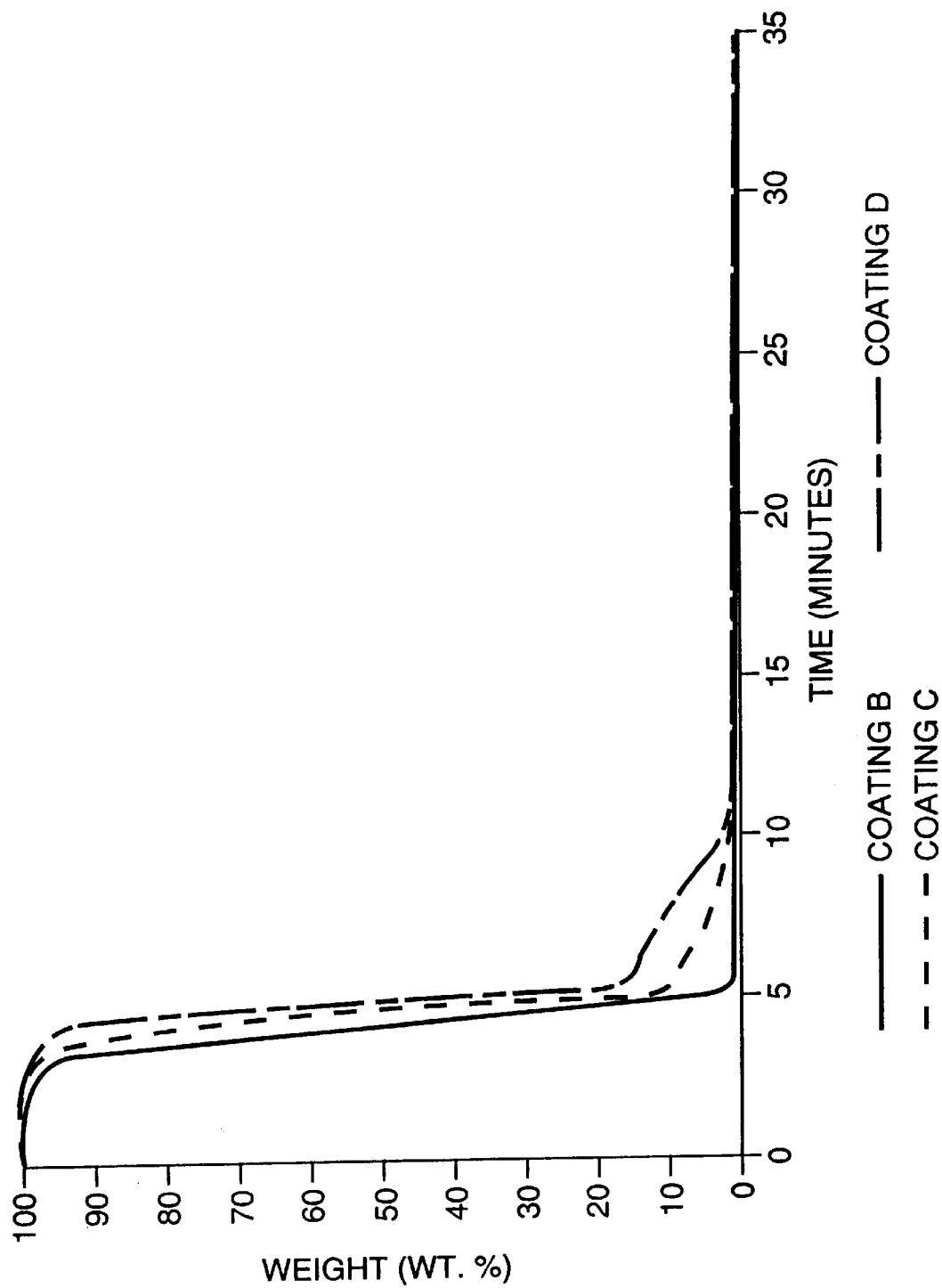
FIG. 3 is an isothermal TGA plot at 600° C. of the coatings used in Example 1.

FIG. 2 is an isothermal plot of coatings B, C and D at a temperature of 500° C. in air. Coating B, DSM 5000-2, clearly leaves less residue following a 30 minute heating period than coatings C and D. Similar results are achieved at 600° C., as shown in FIG. 3. Thus, it is clear that coating B, DSM 5000-2, which has a residuum of less than about 5% by weight, based on the initial coating weight under test, following about 5 minutes of exposure at a temperature of about 500–600° C., is substantially completely removed in a commercially feasible time period, and is a suitable coating for the process of the present invention.

Example 2

To determine the effect of the thermal removal of the coatings of Example 1 on the strength characteristics of an optical fiber population, three fiber draws were performed to prepare optical fiber elements coated with each of the three Example coatings B, C, and D above to yield optical fibers B, C, and D respectively. The example coatings were coated using conventional pressure coating techniques onto a fiber freshly drawn from a fire polished high purity silica preform at a draw speed of 55 meters per minute on a standard production fiber draw tower. The diameter of the silica fiber was 80 μm and the final coated fiber diameter was 128 μm.

A fracture strength test was performed on each optical fiber B, C and D by the dynamic fatigue method of FOTP-28 at 9%/minute strain rate, 4 meter gauge length, using ten specimens per test, for each of the fibers drawn to establish a baseline strength distribution. For the analysis of the fiber strength distribution of fiber after thermal removal of the coating, the specimen was threaded between the mechanical gripping sensor and the capstan of the dynamic fatigue equipment prior to thermal removal of the coating. The coating was removed by the method described and the strength analysis conducted after briefly allowing the fiber to cool.

A hot air gun, Model 27046, manufactured by Dayton Electric Manufacturing Company of Chicago, Ill., was used to remove 3–4 inch lengths of coating from optical fiber B. The hot air gun used was rated at 20 amperes, had a rated operating temperature of 1,000° F. (500–600° C.), and was hand-held at an approximate distance of 2.5 inches (6.5 cm) from the optical fiber.

The strength population of optical fiber B had an initial (prior to coating removal) baseline median fracture stress of about 650 KPSI. Following substantially complete coating removal over a section with the hot air gun, the fracture stress of the B-coated optical fiber population dropped to about 550 KPSI, a reduction of approximately 15%.

The Dayton hot air gun was used to remove the coatings from optical fibers C and D. However, no combination of coating removal conditions allowed complete removal of the coating to provide a clean fiber surface.

An air knife, available from Air Knife Inc. of Charlotte, N.C., which provides a more concentrated gaseous stream at a higher temperature than the Dayton hot air gun, was then utilized to thermally remove the coating from optical fibers C and D. The air knife used consisted of a stainless steel tube with a resistance wire coiled inside to heat a gas stream. The tube was necked down to an inside diameter of about 3 mm at the downstream end to concentrate the gas flow exiting the tube. A nitrogen flow of 1.5 to 2.3 scfm was input to the supply end of the tube and the temperature of the exiting gas stream was measured as about 600° C. to about 700° C. The heated gas stream was applied at a distance of about 3 mm to about 5 mm from the coated fiber surface.

Optical fiber C, coated with acrylated urethane (DSM 3471-2-113), gave an initial median fracture strength of about 700 KPSI and responded well to thermal removal of the coating. However, the median strength of fiber C was degraded to 160 KPSI during the coating removal process. This is a reduction in strength of 78%.

Optical fiber D, coated with acrylated epoxy (DSM 3471-2-137), gave an initial median fracture strength of about 700 KPSI. The application of heat with the air knife created a charred residue which remained on the fiber regardless of the temperature and flow rate of the heated gas stream applied by the air knife. This condition results in a fiber unsuitable for the further processing necessary to generate an optical fiber device using the process of the present invention. Therefore, post removal dynamic fatigue analysis was not conducted on optical fiber D.

Figure 5:
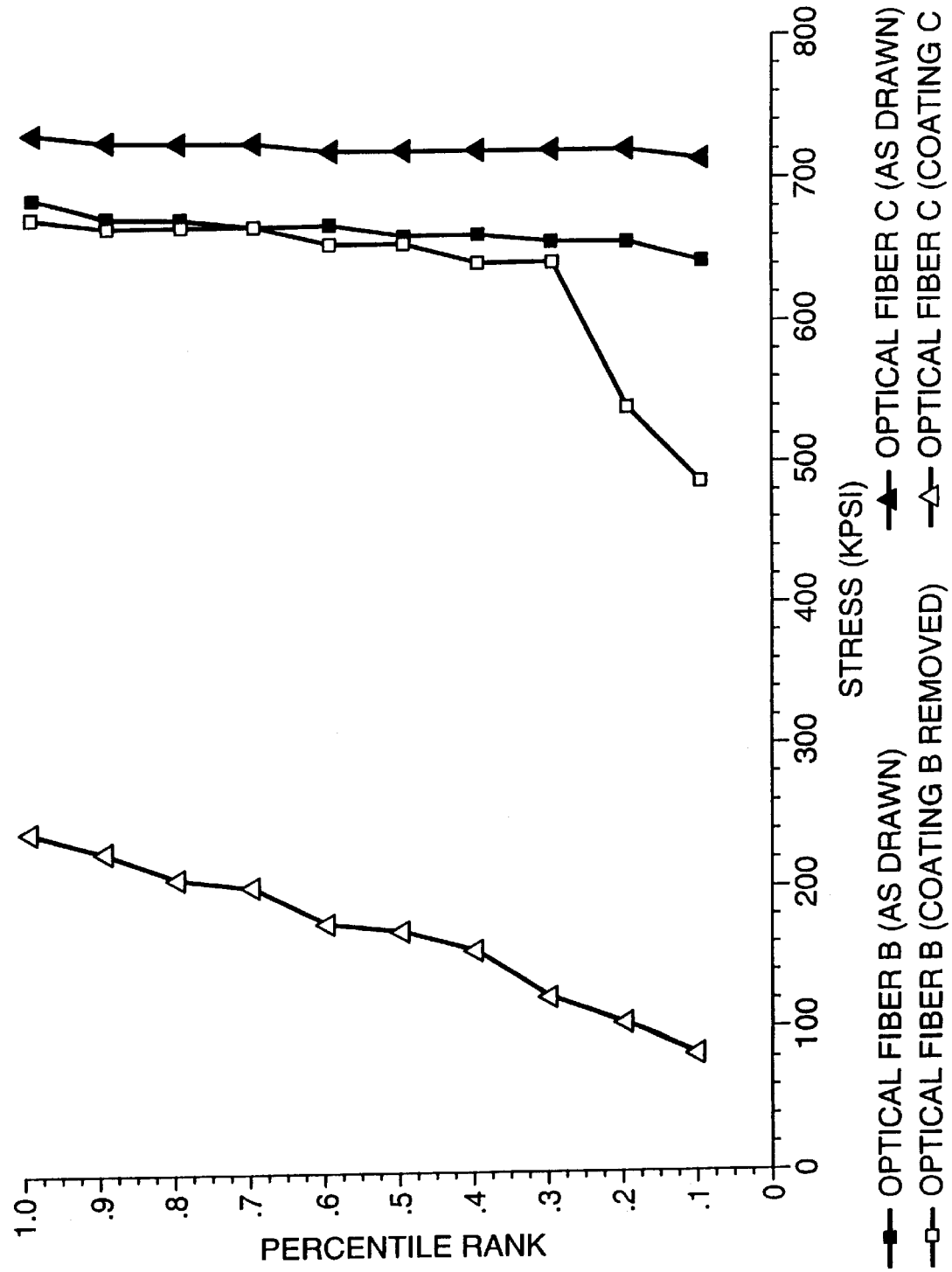
FIG. 5 is a Weibull plot showing the initial fracture strength distribution of optical fibers of Example 2, and the fracture strength distribution of the fibers following thermal removal of the coatings.

FIG. 5 is a Weibull plot summarizing the strength population of the optical fibers before and after removal of the coatings B, C and D of Examples 1–2. There was a substantial reduction in the median strength of optical fiber C upon thermal removal of the coating and the coating cannot be effectively removed from optical fiber D. However, removal of coating B resulted in excellent strength retention for fiber B, so coating B would clearly be preferred for use in the process of the present invention.

It will be understood that the exemplary embodiments described herein in no way limit the scope of the invention. Other modifications of the invention will be apparent to those skilled in the art in view of the foregoing description. These descriptions are intended to provide specific examples of embodiments which clearly disclose the present invention. Accordingly, the invention is not limited to the described embodiments or to the use of the specific elements, dimensions, materials or configurations contained therein. All alternative modifications and variations which fall within the spirit and scope of the appended claims are included in the present invention.

What is claimed is:

1. A method of making an optical fiber device, comprising the following steps:
   (a) providing an optical fiber element comprising an optical fiber having one or more thermally removable polymeric coatings thereon;
   (b) substantially thermally removing a portion of said thermally removable polymeric coating by non-combustively thermally de-polymerizing said polymeric coating to sufficiently expose said optical fiber for a subsequent processing step, wherein said optical fiber has a selected fracture stress, as measured according to FOTP-28, following coating removal; and
   (c) processing said optical fiber to provide an optical fiber device.

2. A method for making an optical fiber device as claimed in claim 1, further comprising a step of recoating the portion of said optical fiber with at least one protective coating following step (c).

3. A method for making an optical fiber device as claimed in claim 1, wherein the optical fiber has a predetermined Weibull modulus, as measured according to FOTP-28, following thermal removal of the coating.

4. A method of making an optical fiber device comprising the following steps:
   (a) providing an optical fiber element comprising an optical fiber having one or more thermally removable polymeric coatings thereon;
   (b) substantially thermally removing a portion of said thermally removable polymeric coating be thermally de-polymerizing said polymeric coating to sufficiently expose said optical fiber to a subsequent processing step; and
   (c) processing said optical fiber to provide an optical fiber device, wherein said thermal removal in step (b) comprises exposing said removable polymeric coating to a heated gaseous stream having a temperature of about 400° C. to about 900° C.

5. A method of making an optical fiber device, comprising the following steps:
   (a) providing an optical fiber element comprising a glass optical fiber having a polymeric coating thereon wherein said optical fiber has an initial median fracture stress as measured according to FOTP-28;
   (b) thermally removing said coating by exposing the coating to a source of heat having a temperature sufficient to de-polymerize and substantially completely remove said polymer coating and to sufficiently expose all or a portion of the optical fiber for subsequent processing, wherein the median fracture stress of the optical fiber following coating removal, as measured according to FOTP-28, is at least 50% of the initial value; and
   (c) processing said optical fiber to provide an optical fiber device.

6. A method for making an optical fiber device as claimed in claim 5, further comprising a step of recoating the portion of said optical fiber with a protective coating following step (c).

7. A method for making an optical fiber device as claimed in claim 5, wherein said optical fiber has an initial Weibull modulus, as measured according to FOTP-28, and wherein the Weibull modulus following thermal coating removal is greater than or equal to about 50% of the initial Weibull modulus.

8. A method of making an optical fiber device, comprising the following steps:
   (a) providing an optical fiber element comprising a glass optical fiber having a polymeric coating thereon wherein said optical fiber has an initial median fracture stress as measured according to FOTP-28;
   (b) thermally removing said coating by exposing the coating to a source of heat having a temperature sufficient to de-polymerize said polymer coating and to sufficiently expose all or a portion of the optical fiber for subsequent processing, wherein the median fracture stress of the optical fiber following coating removal, as measured according to FOTP-28, is at least 500% of the initial value; and
   (c) processing said optical fiber to provide an optical fiber device, wherein said thermal removal in step (b) comprises exposing said polymeric coating to a heated gaseous stream, wherein the temperature of the gaseous stream is about 400° C. to about 900° C.

9. A method for making an optical fiber device as claimed in claim 8, wherein said gaseous stream comprises nitrogen.

10. A method of making an optical fiber device, comprising the following steps:
    (a) providing an optical fiber element comprising a glass optical fiber having a removable polymeric coating thereon, wherein said glass optical fiber has an initial median fracture stress as measured according to FOTP-28;
    (b) exposing said removable coating to a heated gaseous stream to non-combustively thermally de-polymerize a portion of said removable coating and expose a portion of the glass optical fiber for subsequent processing, wherein following de-polymerization and volatilization of the removable coating,
        the residuum of said removable coating on the exposed portion of the glass optical fiber is less than about 10% by weight, based on the total weight of the portion prior to removal, and
        the median fracture stress of the glass optical fiber, as measured according to FOTP-28, is at least 50% of the initial fracture strength; and
    (c) processing said optical fiber to provide an optical fiber device.

11. A method for making an optical fiber device as claimed in claim 10, wherein the gaseous stream in step (b) is applied with an air knife.

12. A method for making an optical fiber device as claimed in claim 10, further comprising a step (d) of recoating the portion of said optical fiber with a protective coating following step (c).

13. A method for making an optical fiber device as claimed in claim 12, wherein said protective coating is the thermally removable coating.

14. A method for making an optical fiber device as claimed in claim 12, wherein said protective coating is cured following step (d).

15. A method for making an optical fiber device as claimed in claim 10, wherein said optical fiber has an initial Weibull modulus, as measured according to FOTP-28, and wherein the Weibull modulus following thermal coating removal is greater than or equal to about 50% of the initial Weibull modulus.

16. A method of making an optical fiber device, comprising the following steps:
    (a) providing an optical fiber element comprising a glass optical fiber having a removable polymeric coating thereon, wherein said glass optical fiber has an initial median fracture stress as measured according to FOTP-28;
    (b) exposing said removable coating to a heated gaseous stream to thermally de-polymerize a portion of said removable coating and expose a portion of the glass optical fiber for subsequent processing, wherein following de-polymerization and volatilization of the removable coating,
        the residuum of said removable coating on the exposed portion of the glass optical fiber is less than about 10% by weight, based on the total weight of the portion prior to removal, and
        the median fracture stress of the glass optical fiber, as measured according to FOTP-28, is at least 50% of the initial fracture strength; and
    (c) processing said optical fiber to provide an optical fiber device, wherein the temperature of the gaseous stream is about 400° C. to about 900° C.

17. A method for making an optical fiber Bragg grating, which comprises the following steps:
    (a) providing an optical fiber element comprising a glass optical fiber having a removable polymeric coating thereon, wherein said glass optical fiber has an initial median fracture stress as measured according to FOTP-28;
    (b) exposing said removable coating to a heated gaseous stream to non-combustively thermally depolymerize a portion of said removable coating and expose a portion of the glass optical fiber for subsequent processing, wherein following depolymerization of the removable coating:
        the residuum of said removable coating on the exposed portion of the optical fiber is less than about 10% by weight, based on the total weight of the portion prior to removal, and the median fracture stress of the optical fiber, as measured according to FOTP-28, is at least 50% of the initial fracture strength; and (c) processing the exposed area of said optical fiber with a laser to form a Bragg grating in said exposed glass portion.

18. A method for making an optical fiber Bragg grating as claimed in claim 17, wherein said exposed area is recoated with a protective coating following step (c).

19. A method for making an optical fiber Bragg grating as claimed in claim 17, wherein the temperature of the gaseous stream is about 400° C. to about 900° C.

20. A method for making an optical fiber Bragg grating as claimed in claim 17, wherein said optical fiber has an initial Weibull modulus, as measured according to FOTP-28, and wherein the Weibull modulus following thermal coating removal is greater than or equal to about 50% of the initial Weibull modulus.

21. A method for making an optical fiber Bragg grating, which comprises the following steps:

(a) providing an optical fiber element comprising a glass optical fiber having a removable polymeric coating thereon, wherein said glass optical fiber has an initial median fracture stress as measured according to FOTP-28;

(b) exposing said removable coating to a heated gaseous stream to non-combustibly thermally depolymerize portion of said removable coating and expose a portion of the glass optical fiber for subsequent processing, wherein following depolymerization of the removable coating:

the residuum of said removable coating on the exposed portion of the optical fiber is less than about 100% by weight, based on the total weight of the portion prior to removal, and the median fracture stress of the optical fiber, as measured according to FOTP-28, is at least 50% of the initial fracture strength; and (c) processing the exposed area of said optical fiber with a laser to form a Bragg grating in said exposed glass portion, wherein said gaseous stream comprises nitrogen.

22. A method of making a fiber optic coil subassembly for a current sensor, comprising the steps of:

(a) providing a coil of an optical fiber element comprising a glass optical fiber having a thermally removable polymeric coating thereon, wherein said glass optical fiber in the coil has an initial median fracture stress as measured according to FOTP-28;

(b) annealing said coil in a mold, wherein during annealing said removable coating is thermally removed to expose the glass optical fiber in said coil, wherein following thermal removal:

the residuum of said removable coating on the glass optical fiber on the coil is less than about 10% by weight, based on the total weight of removable coating on the coil prior to removal.

* * * * *

UNITED STATES PATENT AND TRADEMARK OFFICE
CERTIFICATE OF CORRECTION

PATENT NO.: 5,939,136
DATED: August 17, 1999
INVENTOR(S): Bryon J. Cronk, James C. Novack, Bruce A. Rabine, Paul E. Sanders It is certified that error appears in the above-identified patent and that said Letters Patent is hereby corrected as shown below:

Col. 11, line 44, "500%" should read -- 50%--.

Col. 14, line 2, "100%" should read -- 10% --.

Signed and Sealed this

Fourth Day of January, 2000

Attest:

Attesting Officer

Acting Commissioner of Patents and Trademarks